Aug. 20, 1929.　　　F. L. CAPPS ET AL　　　1,724,992
PICK-UP ARM
Filed Oct. 6, 1928
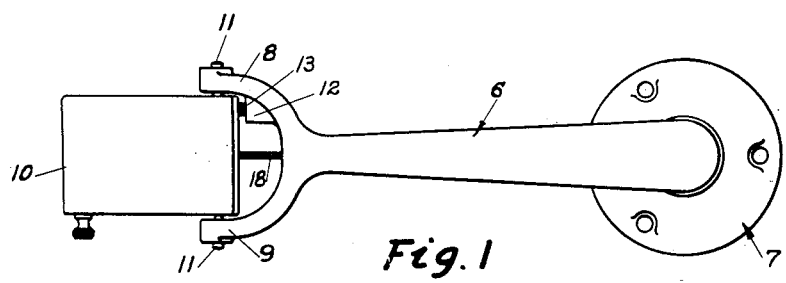
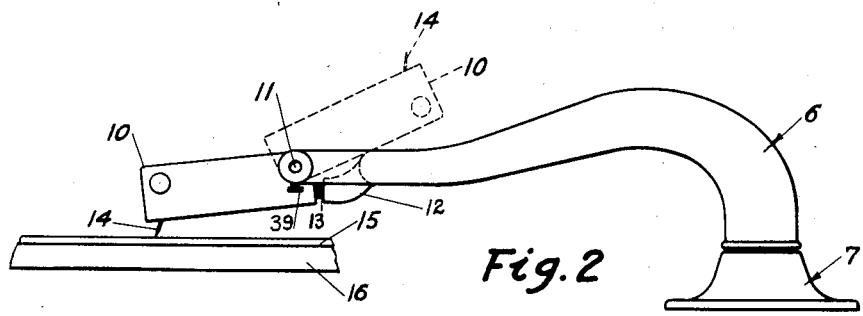
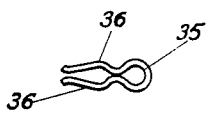
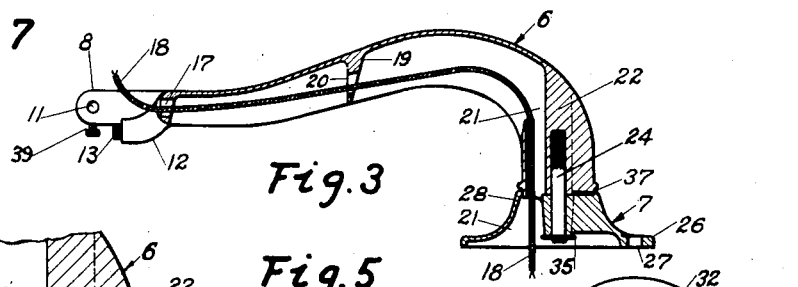
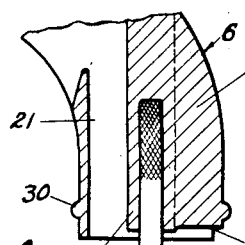
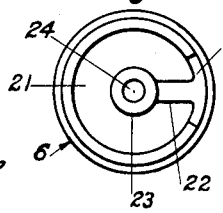
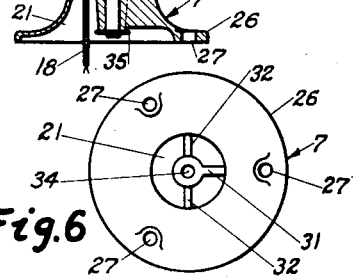
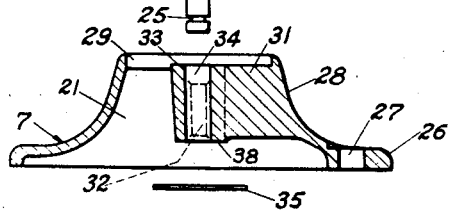
FRANK L. CAPPS
AND
JOHN O. PRESCOTT
INVENTORS
ATTORNEY Patented Aug. 20, 1929.

1,724,992

UNITED STATES PATENT OFFICE.

FRANK L. CAPPS, OF MILFORD, AND JOHN O. PRESCOTT, OF GLENBROOK, CONNECTICUT, ASSIGNORS TO COLUMBIA PHONOGRAPH COMPANY, INC., OF BRIDGEPORT, CONNECTICUT, A CORPORATION OF NEW YORK.

PICK-UP ARM.

Application filed October 6, 1928. Serial No. 310,760.

This invention relates to new and useful improvements in electric phonographs or electric reproducing machines.

An object of the invention is to provide an arm for the "pick-up" of such machines, the arm including means whereby the "pick-up" is supported in a manner to permit of its pivoting on its support to float it evenly over high and low places in a record and to be swung back to inoperative position.

Another object is to provide a pick-up arm or support which may be die-cast.

An additional object is to provide a pick-up having a bearing on its side in combination with a pick-up arm or support having means to engage said bearing to pivotably mount the pick-up.

A more specific object is to provide a pick-up having a bearing place on each of its sides, in combination with a pick-up arm or support having a bifurcated end, the arms of which are disposed at each side of the pick-up to engage said bearings to pivotably mount the pick-up.

A further specific object is to provide a pick-up having a pair of spaced bearings in combination with a pick-up arm including means for mounting the pick-up arm for movement in a horizontal plane only, the pick-up arm including a bifurcated portion between the arms of which the pick-up is mounted by said bearings for movement in a vertical plane only.

A further object is to provide a pick-up arm and a mounting or base therefor in combination with means for facilitating the assembling and disassembling of the base and arm.

A still further object is to provide a pick-up arm and a base or mounting therefor, the parts including means for limiting the turning or swinging movement of the arm on the base.

Another object is to provide a pick-up arm, and a base or mounting therefor, the parts including means for securing the base and arm together and for limiting the movement of the pick-up arm relative to the base.

With the foregoing and other objects in view as will become more apparent as the description proceeds, the invention consists in certain features of construction, combination and arrangement of parts as will be hereinafter more fully described and pointed out in the appended claims.

While the invention will be shown and described in detail, it is to be understood that this is by way of disclosing or teaching the invention, and is not to be considered as limiting the same, since changes in construction, combination and arrangement of parts may well be made within the scope of the appended claims.

In the accompanying drawing:—

Fig. 1 is a plan view of the pck-up and the pick-up arm and base or mounting for the latter, in accordance with the invention;

Fig. 2 is a side elevational view thereof, the dotted lines showing the position of the pick-up when it is swung back to inoperative position;

Fig. 3 is a central longitudinal sectional view through the arm and its supporting base;

Fig. 4 is an enlarged detail sectional view showing the parts separated;

Fig. 5 is a view looking into the downturned end of the pick-up arm;

Fig. 6 is a view looking downwardly on the base; and

Fig. 7 is a plan view of the securing means or key for readily securing the arm and its base or mounting, together.

Referring in detail to the drawing, the improved pick-up arm 6, is secured to and mounted for movement in a horizontal plane on a base 7, in a manner to be described. At its outer end the arm 6 is bifurcated to provide spaced apart, horizontally extending arms 8 and 9 between which is mounted a pick-up 10 of any preferred form or construction.

Bearing screws 11 are carried by the outer ends of the arms 8 and 9. These screws have their ends shaped to provide centers entering bearings in the sides of the pick-up 10 adjacent the rear end thereof and are secured in adjusted positions as by lock screws 39. Pick-up 10 is free to rock up and down on the screws 11 to compensate for high and low spots on a record and when not in use may be swung back to the inoperative position shown in dotted lines in Fig. 2.

A projection 12, on the arm 8, carries a rubber or other bumper or pad 13 for limiting the downward movement of the pick-up, as shown in Fig. 2. In that figure the pick-up is shown with its stylus or needle 14 engaging a disc sound record fragmentarily shown at 15 as mounted on any suitable turntable, fragmentarily shown at 16, the turntable being driven by any suitable means not shown. When the pick-up is thrown back to inoperative position it rests on the arm as shown by the dotted lines in Fig. 2.

The arm 6, is hollow and open on its under side as shown in Fig. 3. This structure enables the arm to be die cast and provides a structure through which the wires 18 from the pick-up 10 may be easily and quickly threaded. At its forward end, the arm is provided with an opening 17 through which the wires 18 pass.

Approximately midway of the length of the arm a bridge 19 is provided for strengthening the arm and for holding the wires 18 within the arm. This bridge or rib 19 is cast with the arm and is provided with an opening 20 through which wires 18 pass. The rear downturned end of arm 6 is so cast as to provide a passage 21 for the wires 18, this passage continuing through the base or mounting 7.

A web 22 is cast with the rear portion of arm 6 and cast into the enlarged portion 23 of the web is a pin 24, the pin being located centrally of the downwardly extending rear cylindrical portion of the arm. This pin 24 is used as a pivot for the arm and as a means for connecting the arm to base 7. At its lower end (Fig. 4) the pin is grooved as at 25 for a purpose to be described.

The base 7 includes a securing flange 26 having spaced screw openings 27 and an upwardly and inwardly curved cylindrical portion 28. At 29 the base receives the lower portion of arm 6 and the bead 30 of said arm acts as a limiting guard. Three webs are provided in the base 7, one of said webs, 31, being of slightly greater height than the other two webs designated 32.

An enlargement 33 is formed at the juncture of the webs and this enlargement provides a bearing surface against which enlargement 23 engages when the arm and base are assembled. Enlargement 33 is provided with an opening 34 extending through its length for the reception of pin 24. When the base and arm are to be assembled it is but necessary to insert pin 24 through the opening 34 and slip a spring key or securing means 35 over the pin, the intermediate portions 36 of the key engaging in the groove 25 in the pin. In this manner and due to contact between portions 23 and 33 the arm is secured to the base against any movement except a turning movement. Means other than groove 25 and key 35 may of course be used.

Pin 24 fits snugly but easily turnably in the opening 34 and means are provided for limiting the turning movement of the arm relative to the base. Such means is necessary to prevent the cutting of the wires 18 such as would happen if the arm were given a complete rotary movement on or while connected to the base. There is further necessity for limiting the movement of the pick-up arm on the base in order to prevent damage to a record or to the pick-up when the needle passes the center of the record and the direction of movement of the record is against the needle instead of from it. In the opposite direction, the limit of movement is necessary to prevent striking the pick-up 10 against the interior of the cabinet.

With this in view, the lower end of the arm 6 is cut away to provide a notch 37 and this notch straddles the higher rib 31 of the base. The arm may be swung about pin 24 as a pivot until either side of the notch 37 is brought into engagement with the rib 31. As clearly shown in Fig. 5, the opening through the arm is almost a complete circle and as shown in Fig. 6, the opening through the base is substantially a half circle. The notch 37 is a bit less than a quarter of a circle and it is therefore impossible, when the parts are assembled, to move the arm relative to the base for a sufficient distance to cut the wires 18 or to damage the record or pick-up in the manner previously mentioned.

From the foregoing description, it will be apparent that we have provided a pick-up and support or arm therefor which may be readily and quickly assembled. It is but necessary to adjust the bearing screws 11 to position the pick-up 10. After that the wire is threaded through the arm as already described and the base and arm connected.

In connecting the base and arm, the pin 24 is inserted in opening 34 and the parts pushed together and rotated a short distance relatively until notch 37 receives the upper portion of web 31. When that occurs the pin 34 will be projecting below the part 33, a sufficient distance to permit the key 35 being slid against said part and into position bearing against the adjacent portion of the base to prevent upward movement of the pin and arm, and with its portions 36 in the groove 25 of the pin.

By constructing our pick-up arm in the manner described that is, hollow for substantially its entire length and open on its under side, we have a structure which lends itself to die casting. This enables cheaper manufacture and yet the appearance of the arm is unimpaired, as is likewise its ability to function. The connection at the front through which the opening 17 is provided and the bridge portion 19 serve to strengthen the arm. Further, this structure provides holding or supporting means for the cable 18, and retains it within the arm.

In addition, this hollow construction has the advantage of being light in weight and, therefore, offers little inertia to the lateral movement of the arm which is actuated in this direction by the co-action between the delicately mounted needle and the abrasive surface of the record. Owing to the large opening 21 through the rear end of the arm and through the base, the arm has perfect freedom in a wide lateral motion, and the danger of cutting the cord or cable 18 is avoided.

It is also pointed out that the parts may be easily and quickly assembled and disassembled, and yet they are securely mounted to avoid rattle. This means of connecting the parts also insures that they are in their proper relative positions, since, unless the upper portion of the rib 31 is received in the notch 37, pin 24 will not project sufficiently below the opening 34 to permit the key 35 to be properly positioned.

By our peculiar structure of light weight or small mass of pick-up arm, short swivel, and the horizontal position of the pick-up, we have relieved the delicately mounted armature from stresses tending to impair the motion of the armature in responding to the lateral undulations of the groove corresponding to sound waves. This stylus in connection with the armature has two forces acting upon it; one, the result of the spiral groove in motion impelling the entire mass of pick-up and pick-up arm from periphery to center. This force has no relation to sound reproduction; the other, the result of the undulations in the side walls which correspond to the sound waves. When the stylus and armature may respond without restraint to these sound wave undulations, the reproduction approaches most nearly the original. This ideal motion of the stylus and armature, however, is somewhat impaired by the force mentioned above which is the result of the spiral impelling the pick-up toward the center. The greater the mass or inertia of the pick-up and pick-up arm, the greater will be the impairment of sound reproduction due to the interference with the vibrations of the stylus and armature in response to the sound wave undulations at either wall of the groove. We have, by our structure, reduced the amount of this interference to a minimum.

There is a decided advantage in having a short swivel for the pick-up 10. When the pick-up swivels from the back end of the pick-up arm, there is considerable mass to be moved and inertia to be overcome. When this mass is in motion, it lessens the delicate flexibility of the armature. In the present instance, this is gained by the light mounting and short swivel on the pick-up itself. In the present instance, a more delicate response is obtained by the use of the short swivel in a horizontal position. This enables us to use a lighter tension in our pick-up armature and accordingly means less wear on the record groove, less surface noise, and in addition, better reproduction, due to greater flexibility in following the lateral undulations.

Having thus described our invention, what we claim is:

1. In combination, an electric pick-up including a housing, a bearing on said housing, and a pick-up arm having a part arranged to one side of said housing and carrying means for co-operating with said bearing whereby said pick-up is mounted for vertical movement.

2. In combination, an electric pick-up, a support for said pick-up, said support including a pair of arms between which said pick-up is bodily disposed and on which said pick-up is mounted for pivotal movement in a vertical plane.

3. In combination, an electric pick-up having a bearing in its body portion, and a pick-up arm having an adjustable screw for co-operating with said bearing whereby said pick-up is mounted for vertical movement.

4. In combination, an electric pick-up, a support for said pick-up, said support mounted for swinging movement in a horizontal plane only, said support including a pair of spaced apart horizontal extending arms rigid with said support, and means on said arms for mounting said pick-up for movement in a vertical plane only one of said means being on each of said arms.

5. In combination, an electric pick-up, a support for said pick-up, means for mounting said support for swinging movement in a horizontal plane only, said support including a pair of spaced apart horizontally extending arms, and means on said arms for mounting said pick-up bodily between them for vertical pivotal movement relative to the arms.

6. As a new article of manufacture, a supporting arm for an electric pick-up, said arm being an integral die cast structure and comprising a substantially horizontal and substantially vertical portion, and being hollow and open on its under side as regards the horizontal portion, and having an opening through said vertical portion entering the opening in the horizontal portion.

7. In combination, a supporting arm for an electric pick-up, a mounting for said arm, a pin projecting centrally from the lower end of said arm, an opening arranged centrally in said mounting, said pin adapted to project through and beyond said opening when the parts are assembled, and means to engage the lower end of said pin, and retain the parts in assembled relation.

8. In combination, a pick-up arm, a base for said arm, a notch in the lower end of said arm, a projection on said base adapted to enter said notch and limit the relative movement of the parts, a pin carried by one of said parts, an opening in the other of said parts, said pin adapted to project through and beyond said opening, and means to engage the projecting end of said pin and retain the parts in assembled relation with the projection in the notch.

9. In combination, a pick-up arm including a substantially horizontal and a substantially vertical portion, said horizontal portion being hollow and open on its under side, said vertical portion being substantially entirely open from its underside, a base or mounting having an opening, all of said openings aligning whereby a wire may be passed through said pick-up arm and base and lie within the hollow portion of said pick-up arm for supporting the wire and preventing the same from sagging and being exposed below the lower surface of the arm.

10. In combination, a pick-up arm, a mounting for said arm, a pin carried by one of said parts, the other of said parts having an opening, and said pin adapted to project through and beyond said opening, and spring means for engaging the projecting end of said pin and holding the parts in assembled relation.

11. In combination, a pick-up arm, a base for said arm, a pin carried by one of said parts and projecting through and beyond the other of said parts, the projecting end of said pin being grooved and a spring member having arms adapted to enter said groove at opposite sides of the pin to secure said parts in assembled relation.

12. In combination, an electric pick-up, a support for said pick-up, said support including a pair of arms between which said pick-up is bodily disposed and pivotally mounted for swinging movement in a vertical plane only.

13. As a new article of manufacture, a supporting arm for an electric pick-up, said arm comprising a substantially horizontal and substantially vertical portion, and being hollow and open on its under side as regards the horizontal portion, and having an opening through said vertical portion communicating with the opening in the horizontal portion.

14. In combination, an electric pick-up, a support for said pick-up, said support including a pair of arms between which said pick-up is bodily disposed, and a screw carried by each of said arms, said screws pivotally mounting said pick-up for swinging movement between the arms.

15. In combination, an electric pick-up, a support for said pick-up, said support including a pair of spaced apart forwardly projecting arms integral with the support disposed one at each side of the body of the pick-up, and means on said arms pivotally mounting the pick-up for pivotal movement between the arms.

Signed at New York, in the county of New York and State of New York, this 26th day of September, A. D. 1928.

FRANK L. CAPPS.
JOHN O. PRESCOTT.